United States Patent [19]

Burry

[11] 4,376,085

[45] Mar. 8, 1983

[54] METHOD FOR PRODUCING UNIFORM DENSITY AND WEIGHT BRIQUETTES

[75] Inventor: Stephen W. Burry, Geneva, Ind.

[73] Assignee: CTS Corporation, Elkhart, Ind.

[21] Appl. No.: 156,387

[22] Filed: Jun. 4, 1980

[51] Int. Cl.[3] .......... B29C 7/00

[52] U.S. Cl. .......... 264/40.4; 264/109; 264/120; 264/104

[58] Field of Search .......... 264/40.4, 109, 120, 264/104

[56] References Cited

U.S. PATENT DOCUMENTS

| | | | |
|---|---|---|---|
| 2,888,715 | 6/1959 | Frank | 264/120 |
| 3,255,716 | 6/1966 | Knoechel et al. | 264/40.4 |
| 4,000,231 | 12/1976 | Peterson | 264/109 |
| 4,100,598 | 7/1978 | Stiel et al. | 264/109 |

*Primary Examiner*—James R. Hall

*Attorney, Agent, or Firm*—John A. Young; Larry J. Palguta

[57] ABSTRACT

In a hydraulic press for briquetting loose powders into green components, a load cell senses maximum compacting force. The maximum compacting force is compared with a compacting standard force known to effect a particular weight and density of compacted briquette. There is next operated a closed-loop servo network which adjusts the peak force to the standard force by varying the initial size of the cavity receiving the loose powders. Should the peak force be greater or less than standard force, an actuating mechanism is energized either to enlarge or diminish the die cavity for receiving the powder. If the peak force is too small, the initial die cavity size is enlarged so that a greater amount of powder is charged to the die cavity. The result is that when the final configuration of the briquette is reached, there will be greater density and greater weight to the briquette, causing it to more nearly approximate a standard briquette weight and density. Conversely, the die cavity is automatically initially reduced in the event that compacting maximum force is too great so that the final compacted briquette will contain less powder, thus reducing the density and weight and thereby adjusting the finished product to a standard briquette size and density.

9 Claims, 16 Drawing Figures

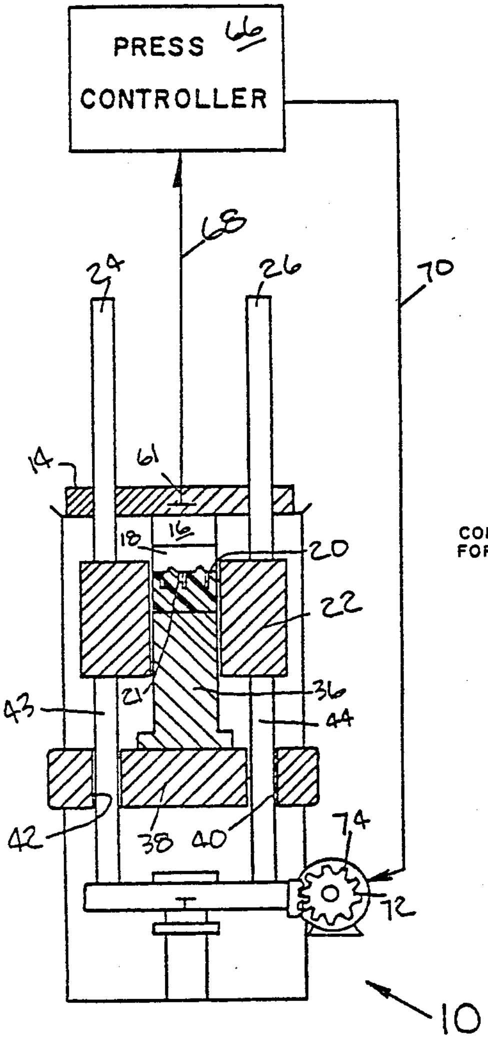
FIG. 2
FIG. 7
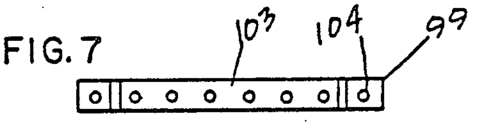
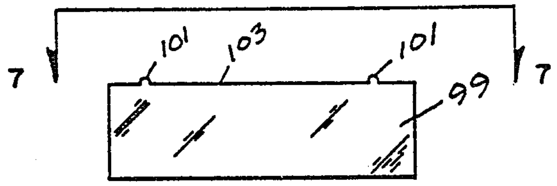
FIG. 6
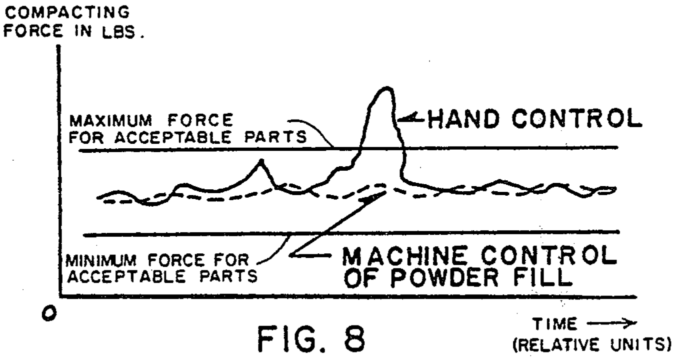
FIG. 8
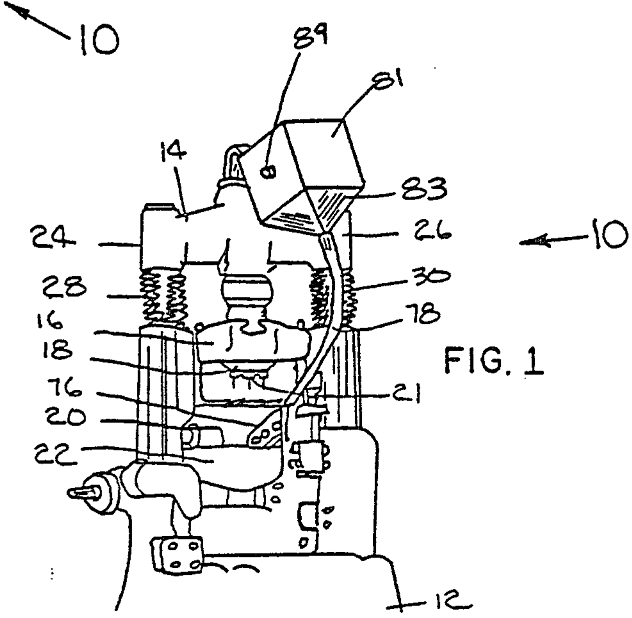
FIG. 1

METHOD FOR PRODUCING UNIFORM DENSITY AND WEIGHT BRIQUETTES

BACKGROUND OF THE INVENTION

It is a standard present practice in the making of a ceramic substrate for electric components, first to effect briquetting of base ceramic powders under high pressure to form a green self-supporting substrate. The green substrate is coherent, relatively rigid, and will not readily crumble or fall apart before firing. The substrate is also apertured and its edges are frequently grooved. The product is fired, causing the compacted ceramic particles to become sintered together and become a rigid self-supporting product. Specifically, the ceramic content is made up of electrically non-conductive powders in the form of alumina, aluminum silicates, kyanite, silliminite, etc., the only requirement being that the particles must be of relatively uniform size, must be compactible, relatively water free, and possesses sufficient strength so that the product will remain coherent until firing. These fired substrates then have various resistance films and conductive paths printed or silk screened onto the surface and fired to effect bonding thereto.

Frequently, substrates vary in size, density, and weight since it is not possible to obtain absolute uniformity of particle size, and further because water content and flowability of powders introduces variations of size and density in the resulting briquette, even though the mold cavity remains the same.

Where there is substantial change in the density, weight and size of the briquette, the operator must be relied upon to make the necessary manual adjustments to the size of the mold cavity in order to reestablish the standard weight, size and shape of the desired briquette. Manual adjustment depends too much upon the skill of the individual operator and frequently necessitates interruptions of the briquetting operations for adjustment. Manual adjustment of the die cavity is too gross and too susceptible to individual judgment. As a result, in long runs, the briquettes deviate substantially from standard weight, size, and density.

SUMMARY OF THE INVENTION

An object of the present invention is to eliminate previously employed manual operations used for periodic adjustment of presses in the making of powder briquettes as part of an intent to secure uniform weight, size, and density of a briquette used for substrates.

It is another object of the present invention to provide a novel closed-loop feedback system in which, continuously with the operation of a powder press, there is produced a finished briquette of substantially constant weight, size, and density by continuously monitoring the maximum force effecting briquetting and utilizing force as the parameter to adjust the effective size of a mold cavity.

Another object of the present invention is to utilize a closed-loop network employing compacting force as the parameter continuously sensed during the die press operation, and in which a standard maximum force is calibrated to effect a desired density, size, and weight of finished briquette. There is continuously adjusted by means of the servo network, the effective size of the mold cavity, all occurring automatically as a function of force, so that necessary adjustments can be made should the physical properties of the feed stock powder vary. The overall physical properties of the green compacted briquette vary only slightly if at all from standard density, size and weight.

Another object of the present invention is to utilize a unique closed-loop feedback network for continuously monitoring compacting of loose powders which are compressed into green briquettes and are adapted for subsequent firing into substrates utilizable for electronic components in the electronic industry. The closed-loop servo network is calibrated to produce a desired briquette weight and density; thereafter, the force by which the standard was obtained, is used as a reference force, and deviations of subsequent compacting forces from standard force are sensed by a load cell associated with the press, and induce a disturbing signal indicative of underdensity or overdensity. The closed-loop network is then effective to control and adjust the mold cavity size.

Other objects and features of the present invention will become apparent from a consideration of the following description. Which proceeds with reference to the accompanying drawings in which an example embodiment is selected by way of illustration.

DRAWINGS

FIG. 1 is an isometric detail of a press having a base, stanchions and ram, adapted to receive the present invention therein;

FIG. 2 illustrates the press and closed-loop feedback network whereby the mold cavity of the press is automatically and continuously adjusted;

FIG. 6 is a front elevation view of a finished briquette;

FIG. 7 is a top view of the briquette viewed in the direction of view line 7—7 in FIG. 6; and, FIG. 8 is a schematic qualitative representation of press COMPACTING FORCE vs. TIME and shows in full line, a representation of adjustment achieved in press compacting force by manual control and in broken line the adjustment achieved by the present invention, by varying the amount of powder fill.

DETAILED DESCRIPTION OF THE INVENTION

Figure 3:
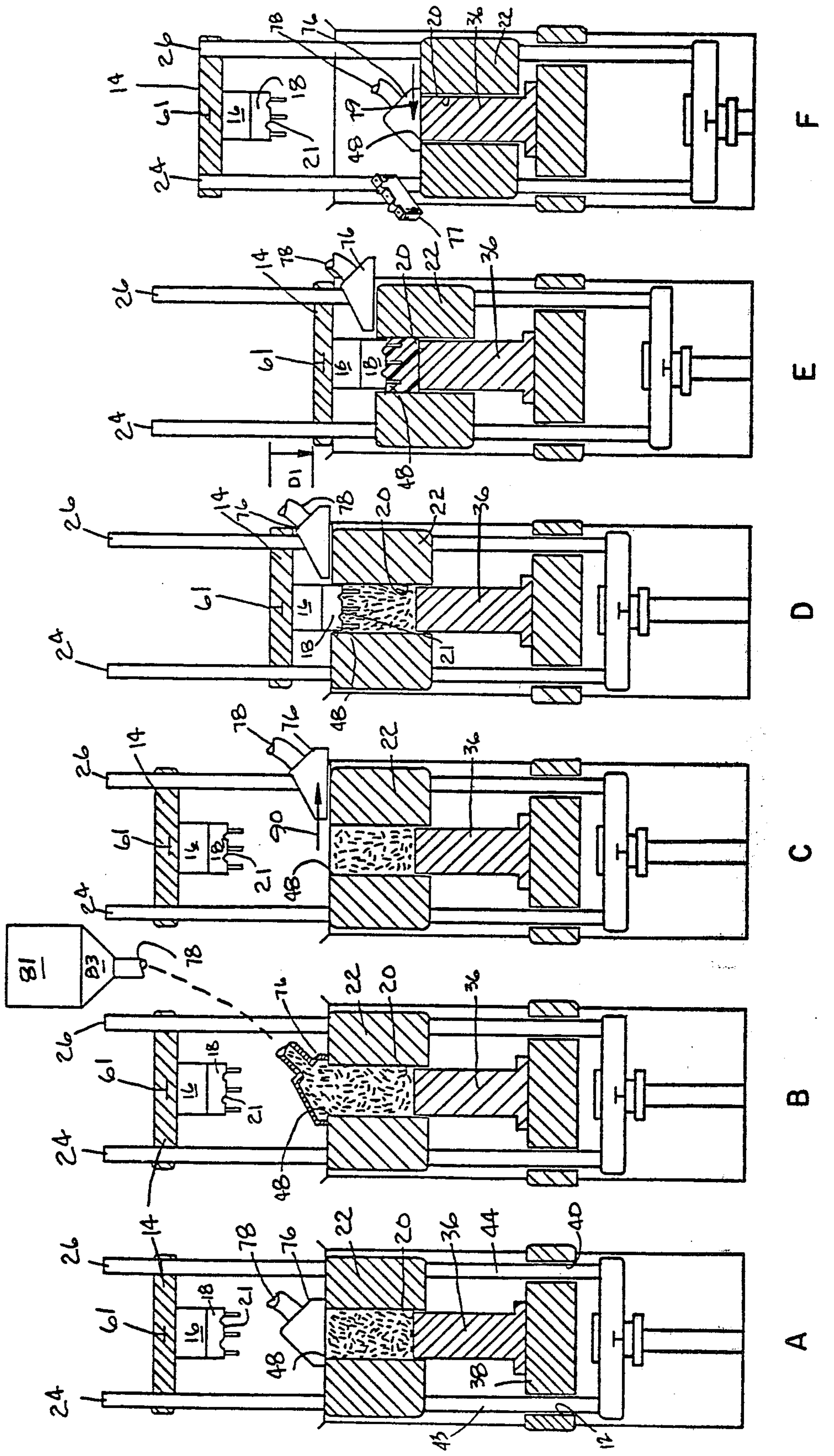
FIG. 3 illustrates sequentially, the charging operation for the mold cavity, subsequent progressive compacting, and then ejection of the fully compacted substrate, starting with FIG. 3A and commencing through 3F.

Referring now to the drawings, and particularly to FIG. 1, a compacting press is designated generally be reference numeral 10, having a base 12 and overhead ram 14, with a ram head 16, and a ram end 18 which enters an open end of the die or mold cavity 20 contained within cavity housing 22. The ram end 18 has a configured mold face 21.

The vertical reciprocable movement of the ram 14 is guided by two upright stanchions 24, 26 with surrounding springs 28 and 30 which hold the ram 14 in a normally vertically raised position. The press can be fluid energized, either liquid or air, and the particular method of operation does not form a part of the present invention.

Referring next to FIGS. 3A–3F, the mold cavity designated generally by reference numeral 20 (FIGS. 3A–F) is formed as a variable volume powder chamber within cavity housing 22. A plunger 36 which controls the effective size of the mold cavity is positioned below the mold cavity by means of a carrier 38 with slide openings 40, 42 forming bearings through which slide fixed die rod sections 43, 44 that insure rectilinear upward movement of mold cavity 20. Compaction is effected first of all by covering the open end 48 of the mold cavity 20 with ram head 16 and end 18 which slightly enters the mold cavity. Further contraction of the mold cavity 20 is thereafter effected by powering the ram head 16 and mold cavity downwardly against the fixed plunger 36.

Within the overhead ram 14 is a load cell 61, which senses the peak compacting force and further determines the initial position of the ram end 18 within the cavity 20. In FIG. 2, press controller 66 receives compacting force information from the load cell 61. The compacting force cycle is typically in the form of a bell-shaped curve, FIG. 4A. Line 68 from load cell 61 transmits information to controller 66. Line 70 then carries signals to a motor 72 which operates the gear drive 74. The motor 72 raises or lowers the cavity housing 22 through stanchions 24 and 26 to vary the mold cavity size, thereby increasing or decreasing the powder receiving capacity of the mold cavity 20.

The mold cavity 20 is filled with loose ceramic powder from a shoe 76 having a conduit 78 connecting with a hopper 81 containing a supply of the ceramic powder. From time to time, the hopper 81 is replenished with ceramic material which can be agitated so that it falls easily to the base 83 (FIG. 1), the material being agitated by an agitator (Not Shown) on shaft 89.

The shoe 76 displaces the compacted briquette 77 (FIG. 3F) by moving in the direction of the arrow 79. The shoe, filled with powder, then overlies the mold cavity 20 before the cavity is expanded so that the cavity, upon expanding (from FIG. 3F to B) will positively draw powder into the mold cavity 20. Thus, powder voids are obviated and the desired filling under positive drawing force greatly speeds up the charging operation. The shoe 76 completely overlies the open end 48 until the mold cavity 20 is completely filled. The shoe 76 then retracts in the direction of the arrow 90 (FIG. 3C) and the ram 14 decends with the ram end 18 entering the die cavity slightly and sealing the die cavity (FIG. 3D).

Thereafter, as shown in the progression views of FIGS. 3D–3E, the ram 14 and cavity housing 22 both move downwardly, against plunger 36 by the amount labeled distance D-1 (FIG. 3E). Following this compression stroke, the ram 14 is raised upwardly from FIG. 3E to FIG. 3F. The finished briquette is ejected from the die cavity and is laterally removed by the shoe 76 advancing in the direction of arrow 79 (FIG. 3F).

Figure 4A:
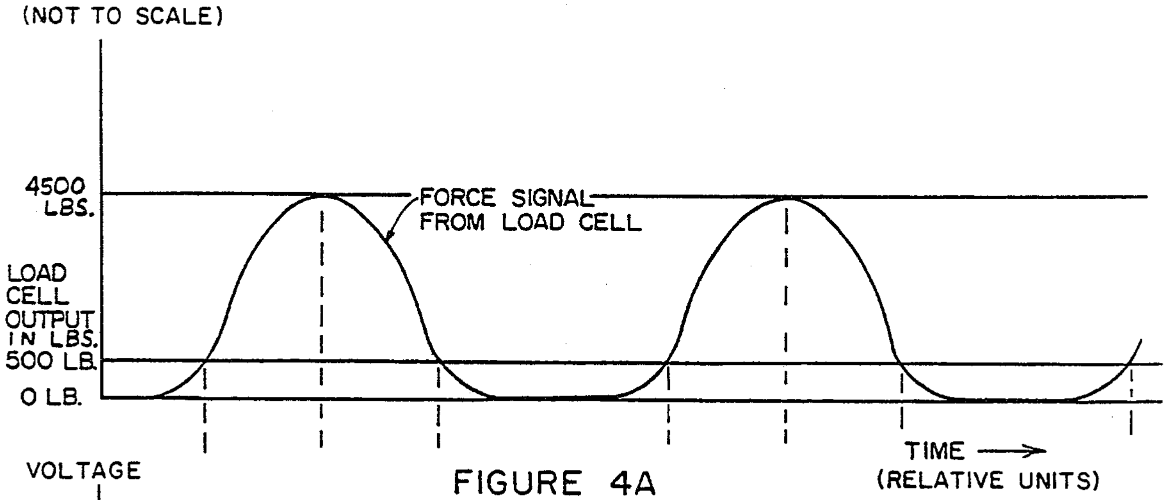
FIG. 4A is a graph in which there is plotted load cell output versus time and illustrating the FORCE SIGNAL FROM LOAD CELL.

FIG. 4A records a succession of "bell" shaped analog signals of the compacting steps illustrating a build up of compacting force to a peak and then a fall off to zero force. It is an important part with present invention that while the forces are accurately noted and responded to, the adjustments to the mold cavity occur at that time when there is a low or no force within the cavity.

FIG. 4A shows the FORCE SIGNAL FROM LOAD CELL curve which illustrates an analog signal representing the force applied to the powder in the mold cavity 20 during the compacting cycle, in pounds as labeled, and also represents an electronic signal used internally of the controlling system to monitor the compacting force. The signal remains at zero pounds force until the compacting cycle starts, at which time it increases to a maximum level, signifying the maximum force attained during the compacting cycle, and thereafter decreases to zero again.

Figure 4B:
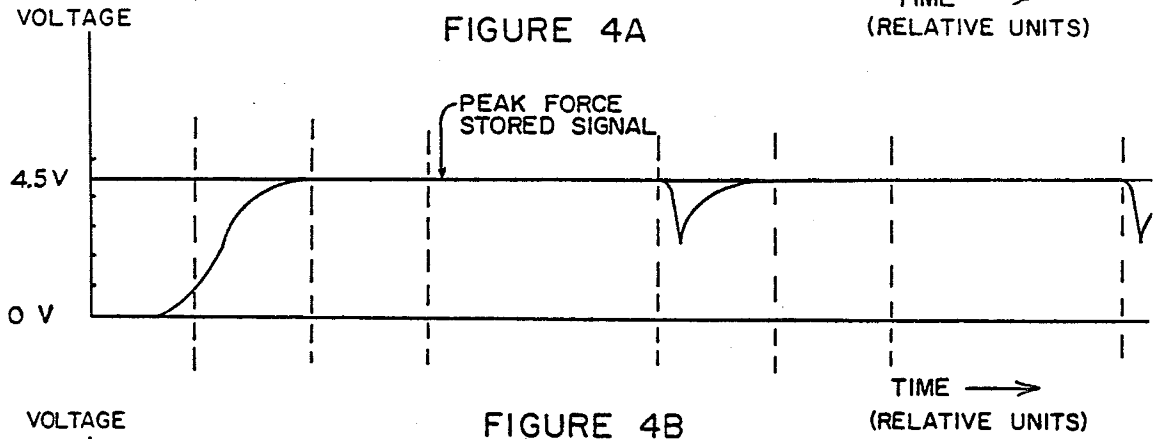
FIG. 4B is a graph also plotting voltage versus time and illustrating the PEAK FORCE STORED SIGNAL.

FIG. 4B illustrates that the peak force is stored and used as control parameter. FIG. 4B represents the PEAK FORCE STORED SIGNAL which illustrates an analog signal starting at zero pounds force on the initial compacting cycle, and rises to a maximum level signifying the maximum force attained as the powder is compacted. This maximum level is stored internally of the controlling system, and is maintained until the RESET SIGNAL (FIG. 4D) occurs. When the RESET SIGNAL occurs at the beginning of the next compacting cycle, the PEAK FORCE STORED SIGNAL decays rapidly but the compacting force is sensed and the signal rises to the level corresponding to the peak compacting force of the next cycle.

Figure 4C:
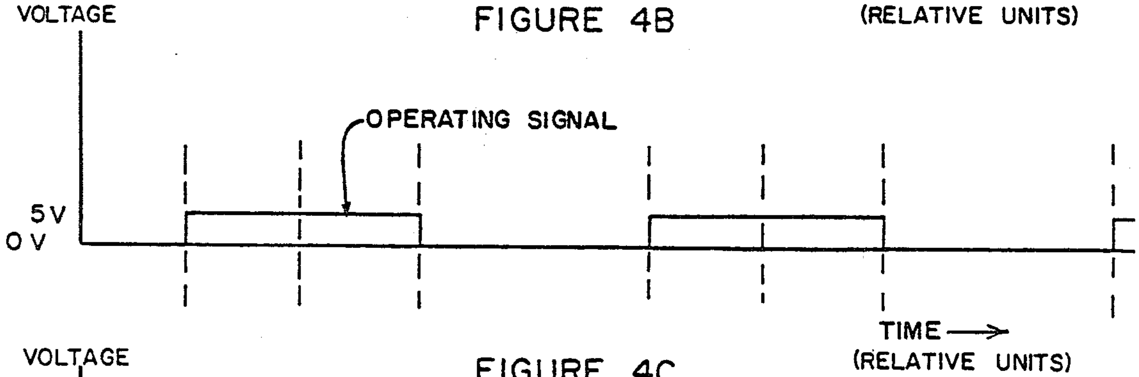
FIG. 4C is a graph plotting voltage versus time and illustrating the OPERATING SIGNAL.

FIG. 4C represents the OPERATING SIGNAL which is a digital signal indicating when the press is in its compacting cycle (duty or operating cycle). The signal remains at logic 0 until the compacting force becomes greater than 500 pounds force, at which time the OPERATING SIGNAL changes from logic 0 to logic 1, indicating that the press is in the compacting cycle. When the pressing force decreases to 500 pounds force, the OPERATING SIGNAL returns to a logic 0.

Figure 4D:
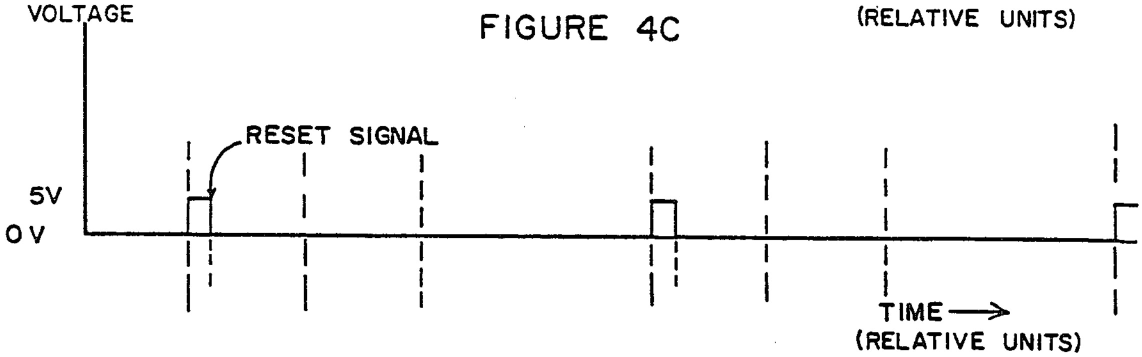
FIG. 4D is a graph plotting voltage versus time and illustrating the RESET SIGNAL.

FIG. 4D illustrates the RESET SIGNAL which is a digital signal initiated by the leading edge of the OPERATING SIGNAL whose purpose is to reset the PEAK FORCE STORED SIGNAL so that the compacting force of the next pressing cycle can be monitored.

Figure 4E:
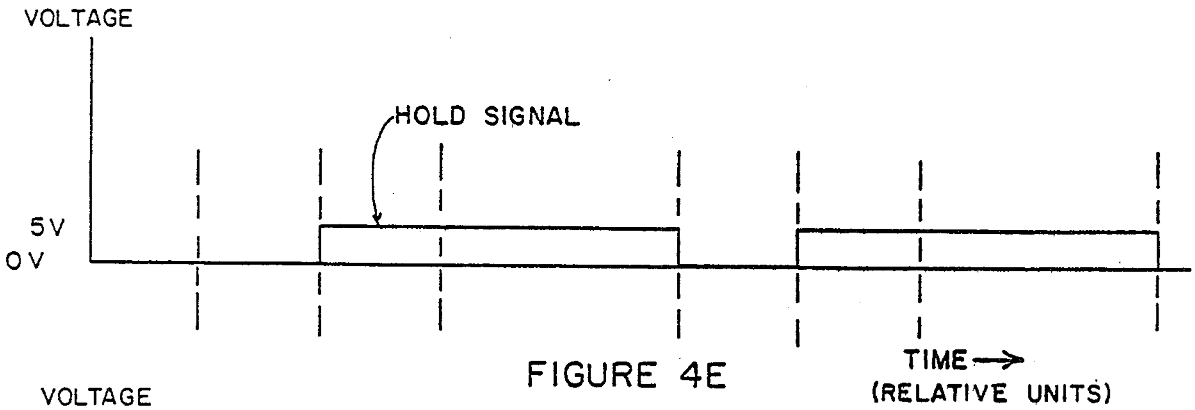
FIG. 4E is a graph plotting voltage versus time and illustrating the HOLD SIGNAL.

FIG. 4E illustrates the HOLD SIGNAL which is a digital signal that switches from logic 0 to logic 1 when the maximum compacting force has been reached. This signal places the analog signal portion of the press controller 66 in the store, or hold mold. The HOLD SIGNAL returns to logic 0 upon initiation of the next OPERATING SIGNAL (FIG. 4C).

Figure 4F:
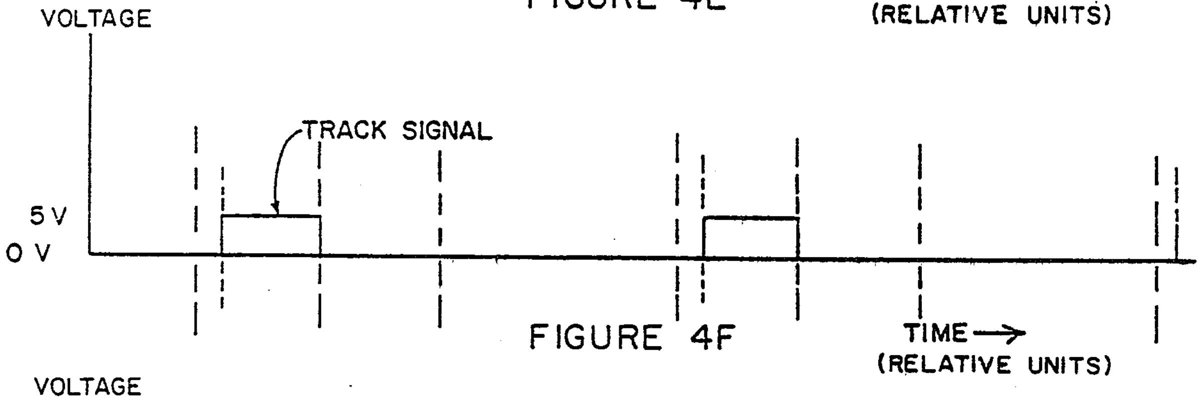
FIG. 4F is a graph plotting voltage versus time and illustrating the TRACK SIGNAL.

FIG. 4F illustrates the TRACK SIGNAL which is a digital signal that is initiated by the trailing edge of the RESET SIGNAL, and that places the analog signal portion of the controller in the tracking mode. This allows the PEAK FORCE STORED SIGNAL to follow, or track, the FORCE SIGNAL FROM LOAD CELL, FIG. 4A.

Figure 4G:
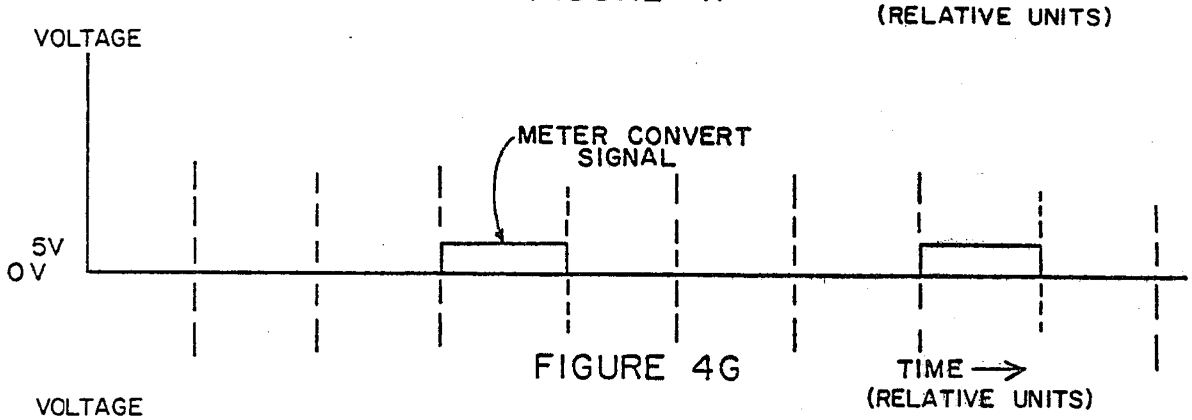
FIG. 4G is a graph plotting voltage versus time and illustrating the METER CONVERT SIGNAL.
Figure 4H:
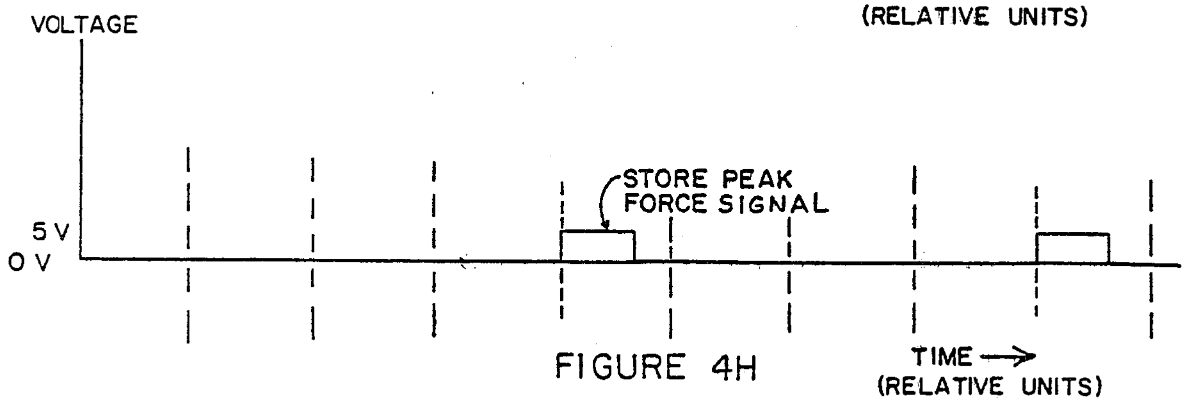
FIG. 4H is a graph plotting voltage versus time and illustrating the STORE PEAK FORCE SIGNAL.
Figures 5, 5A:
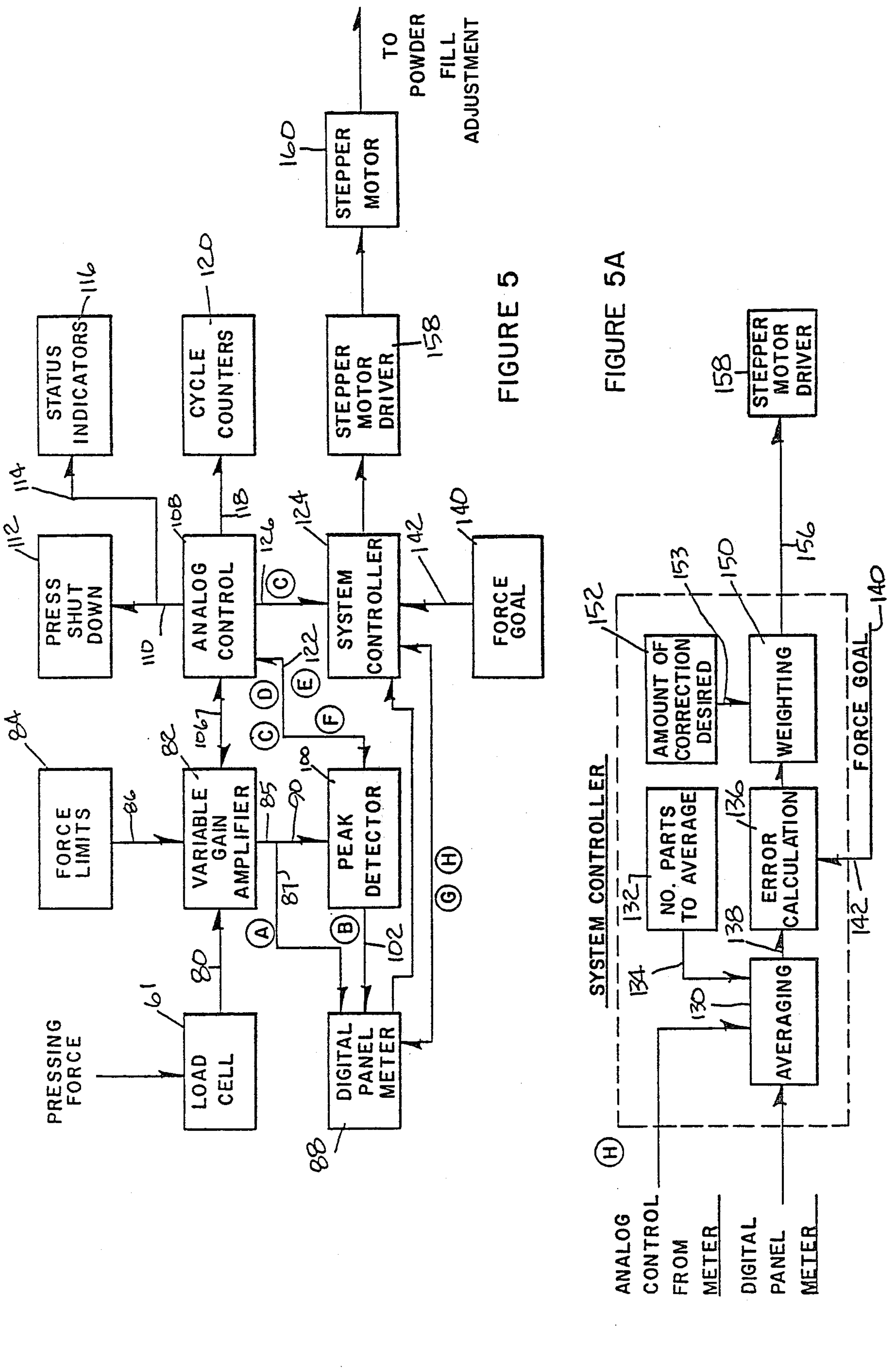
FIGS. 5 and 5A illustrate in block diagram the press controller control network utilizing compacting force as the control parameter and a stepper motor effective for controlling die size as the output of the servo network, with FIG. 5A being a detail of the system controller.

As soon as the OPERATING SIGNAL pulse is terminated (FIG. 4C), a METER CONVERT SIGNAL pulse (FIG. 4G) is initiated. FIG. 4G illustrates the METER CONVERT SIGNAL which is a digital signal initiated by the trailing edge of the OPERATING SIGNAL (FIG. 4C), and that instructs the digital panel meter 88 to convert the PEAK FORCE STORED SIGNAL (an analog signal) to its digital equivalent. At the end of the METER CONVERT SIGNAL, a STORE PEAK FORCE SIGNAL pulse (FIG. 4H) is initiated, and is clocked for a definite duration to permit digitization of the analog information derived from load cell 61 and which operates the adjustment of the mold cavity, following which it then terminates. In other words, the STORE PEAK FORCE SIGNAL of FIG. 4H illustrates a digital signal initiated by the trailing edge of the METER CONVERT SIGNAL, that instructs the processing portion of the press controller 66 to store the digital equivalent of the PEAK FORCE STORED SIGNAL FIG. 4B in memory. This force measurement is used in the computation of the amount of adjustment necessary to provide for proper press operation, as will be explained hereinafter. The conversion from analog to digital information is through panel meter 88 (FIG. 5), the digital information then being fed to the system controller 124 which calculates the exact degree of adjustment of cavity size by the motor 72 and gear drive 74. These events (FIGS. 4A–H) occur as shown in the Flow Diagram of FIGS. 5 and 5A. The events occurring in FIGS. 5, 5A are labeled by the indicated letters. Thus A in FIG. 5 corresponds with the signal in FIG. 4A, B in FIG. 5 is represented by the signal in FIG. 4B, etc.

During the aforedescribed cycle, force is initially developed to about 500 pounds. As shown (FIG. 4C), there is then initiated an operating or duty cycle commencing at 0.5 volts and 500 pounds force, and continuing until the terminal part of the briquetting operations when force declines to less than 500 pounds force.

Referring to FIGS. 4A–4H and 5, and more particularly to FIG. 5, the system operates by initially sensing a compacting pressure with the load cell 61. The peak pressure through a Peak Detector 100 is stored for a series of 25 such counted and average peak forces. An adjustment is then made to the mold cavity, while there is no force within the mold cavity.

This is accomplished in a manner which will be clear from comparing FIGS. 4A–4H and 5. A press force is communicated to load cell 61 which in turn is communicated through line 80 to a variable gain amplifier 82. The variable gain amplifier 82 receives information from a force limit device 84 through line 86 so that should the load cell indicate a force which is beyond the force limit dictated from 84, the machine can be immediately shut down.

From the variable gain amplifier 82, there is communicated through line 85 and line 87 a pressure read-out as indicated by digital panel meter 88. The variable gain amplifier 82 is likewise communicated through line 90 to a Peak Detector 100 which is also displayed on the digital panel meter 88 through line 102. There is thus displayed on the digital panel meter 88 not only the dynamic force as it develops and is transmitted by the variable gain amplifier, but also the peak force is read and maintained upon the digital panel meter. The curves indicating this are set forth as signals in FIGS. 4A and 4B.

The variable gain amplifier 82, as indicated by the double arrow headed line 106, communicates with analog control 108 also connected through line 110 to a press shut down device 112. Line 114 connects from analog control 108 to Status Indicators 116, viz., a counter which shows the number of briquettes which are above and below the desired limits established as indicated in FIG. 8.

Analog control 108 also, acting through line 118 to a cycle counter 120, indicates the number of components which have been produced, corresponding to the structure shown in FIGS. 6 and 7.

The analog control 108 is connected through double arrow line 122 to a Peak Detector 100 whereby there is both transmitted and received the control parameters shown as signals in FIGS. 4C–4F, i.e., the OPERATING SIGNAL of FIG. 4C, the RESET SIGNAL of FIG. 4D, the HOLD SIGNAL in FIG. 4E, and the TRACK SIGNAL in FIG. 4F. The analog control communicates with the system controller 124 which receives the digitized peak force information from digital panel meter 88.

The system controller 124 is more fully described in FIG. 5A, and includes an averaging calculator 130 having an appropriate memory based upon the number of parts to average 132 communicated through line 134. The deviation is then established in an error calculation 136 having received the averaging 130 from line 138 and the force goal 140 which is pre-calibrated and fed to the error calculation from line 142.

Depending upon the degree of deviation of the error from the norm (the midline between the maximum and minimum of FIG. 8), there is a weighting valuation applied from calculator 150 into which is fed an amount of correction desired 152 from line 153, and from this, the amount of correction of the mold cavity is established as an output through line 156 to a stepper motor driver 158 and from thence to a stepper motor 160 which mechanically adjusts the cavity housing 22.

By this means of supplying "average" forces, and by making cavity size corrections in pre-calculated increments, it is possible to avoid "hunting" which might otherwise occur. That is, if there is a substantial deviation of average pressure from the desired calibrated pressure, the correction is made toward the standard or calculated pressure in increments rather than in the total amount. That is, some of the deviation can be assumed to be caused by merely transient effects and by attempting too great of adjustments to standard force, it is possible to "under shoot" and "over shoot" the adjustments so that the system becomes prone to "hunt" by first overcompensating and then by undercompensating in search for the appropriate pressure.

By making adjustments on the averaged 25 series of briquettes, it is possible to avoid excessive numbers of adjustments which is otherwise too prone to cause wear in the press components, while at the same time adjustments within this 25 sample range, fed into the average value, prevents the press from straying too far out of the confines of the maximum force limits and minimum force limits as indicated in FIG. 8. Thus, the adjustments tend only slightly to wander, but acceptably, and within the limits of the maximum force and the minimum force limits established in FIG. 8.

The product produced is the briquette 99 shown in FIG. 6, having stand-offs 101 and openings 104, all appropriately within the dimensional standards prescribed by the customer or user of the ceramic substrate. Thus, the substrate will fit acceptably on a PC board and with conductors of prescribed size and length.

The ceramic material briquette consists typically of alumina and aluminum silicate provided in the form of kyanite, sillimanite, and andalusite. The particular alumina silicate is not, however, critical to the invention.

The bulk density of the ceramic stock material ranges from approximately 0.0273–0.0329 pounds per cubic inch and has a moisture content in the range of 0.1% to about 0.6%.

The particle size of the ceramic material ranges from passing through minus 40 mesh to retained on minus 325 mesh.

The finished product typically consists of a rectangular ceramic body 99 (FIGS. 6 and 7) having stand-offs 101, and a series of connector openings 104 disposed along the narrow edge dimension of the substrate 99, in surface 103.

The present invention attains a close tolerance in terms of the size and relative spacing of the openings 104 so that the product can be accurately disposed on a PC board with leads of pre-cut and pre-calculated cross section and length.

The press is a standard TPA4 press commonly known as a Dorst press. The load cell described and disposed within the upper part of the press plunger is a product of Toledo Transducer, P.O. Box 6985, Toledo, Ohio.

OPERATION

In operation, the size of the die cavity is originally calibrated by relation to a standard force effective to produce a finished briquette of the desired density and weight. The resulting product is to a certain standard size (FIGS. 6 and 7). This calibrated force is fed into the control network (FIGS. 5, 5A) through the force goal 140 to the system controller 124.

On successive operations, shoe 76 is filled with ceramic material from conduit 78 and supply hopper 81, and travels in the direction of the arrow 79 (FIG. 3F) to a position overlying the mold cavity 20 (FIG. 3F to 3B) and then retracts according to arrow 90 (FIG. 3C). The vacuum of the expanding mold cavity draws ceramic powder into the cavity and obtains void free filling (FIG. 3B). The compacting stroke then commences with the ram 14 descending from the position FIG. 3C to that of FIG. 3D with end 18 inserted into the mold cavity 20, the cavity being sealed by the slight penetration of the cavity by the plunger.

A further compacting stroke is effected by downward movement of the ram and cavity housing 22 from FIG. 3D to the position FIG. 3E, a distance of D1. The control system detects the average peak force over the 25 previous compressions.

Deviations of the averaged forces from standard force is fed into the closed-loop feedback system so that compensating compressive adjustment occurs to the stepper motor driver 158. The mold cavity is adjusted while under no external force. After the briquetting is completed (FIG. 3F), the briquette is ejected by the shoe 76.

There is an assurance of the same density and weight since, during each compacting stroke, load cell information is communicated to the control system which, every 25th operation, effectively adjusts the size of the mold cavity. The general relationship is, if average peak force is too high the die cavity is made smaller and thus the peak force is reduced. If average peak pressure is too low, the cavity is correspondingly made larger. The operation as described occurs continuously as ceramic particles are compacted into briquettes (FIGS. 6, 7) and loose powder is loaded from time to time into the hopper 81.

It is reasonably to be expected that those skilled in the art can make numerous revisions and changes to the invention and it is intended that such revisions and additions will be included within the scope of the following claims as equivalents of the invention.

What is claimed as new and desired to be secured by Letters Patent of the United States is:

1. In a process for making briquettes from loose ceramic particles compressed together under compacting force in an activated press by first placing said particles in a die cavity of said press where said particles are compacted together into a self supporting briquette and the briquette is thereafter removed from said die cavity, and the process is repeated in successive compacting cycles to produce said briquettes, the improvement comprising controlling the size of the die cavity through a closed-loop feedback control network to produce substantially constant density, size and weight briquettes and comprising the steps of:

(a) as part of a compacting cycle, placing said loose ceramic particles in a die cavity of a standard size in accordance with a predetermined standard compacting force value for producing a briquette having a predetermined density, size, and weight, (b) exerting compacting force during a compacting cycle upon said particles in said die cavity to product a briquette thereafter removed from said die cavity, (c) continuously sensing and measuring compacting force during the compacting cycle of steps (a) and (b) to determine a peak compacting force value effected during the compacting cycle and during succeeding compacting cycles, (d) storing within a storage means peak compacting force signals sensed and measured during the successive compacting cycles and averaging a selected number of stored peak compacting force signals to determine an average peak compacting force value, (e) comparing the average peak compacting force value to said predetermined standard compacting force value to determine the difference therefrom, (f) correlating the difference between the average value of the stored peak compacting force signals and the predetermined standard compacting force value to determine the amount of adjustment of die cavity size necessary to produce said briquettes of predetermined density, size, and weight, (g) sending a signal to an adjusting means to adjust the size of said die cavity, and (h) periodically effecting adjustment of said die cavity size by changing the cavity size through the closed-loop feedback control network to produce said briquettes of substantially constant density, size and weight.

2. The process in accordance with claim 1, wherein step (c) includes the step of detecting an initial level of the compacting force developed during each compacting cycle and utilizing said level to effect a resetting of the closed-loop feedback network responsively thereto, and monitoring the increase of compacting force following the resetting of the network, and step (d) includes storing a peak compacting force signal when said compacting force is diminished.

3. The process in accordance with claim 1, wherein step (c) includes utilizing an initial level of the compacting force of each compacting cycle to operatively reset the closed-loop feedback network in order to sense and measure the compacting force of that compacting cycle, step (d) includes the step of storing the peak compacting force signal attained during each of a predetermined number of compacting cycles and retaining the average peak compacting force value determined from said stored peak compacting force signals for said predetermined number of compacting cycles, and step (e) includes comparing the average value of the stored peak compacting force signals to said predetermined standard compacting force value to determine the difference therefrom and thereby form a basis for adjustment of the die cavity size.

4. The process in accordance with claim 1, wherein step (c) includes the step of comparing a peak compacting force value with a predetermined compacting force limit and operatively deactivating said press if said peak force value exceeds said compacting force limit.

5. The process in accordance with claim 1, including the step of defining in advance of a compacting cycle an allowable peak compacting force value for successive compacting cycles, and operatively effecting adjustments in die cavity size to reduce peak compacting force values if a peak compacting force value is equal to or in excess of the allowable force value.

6. The process in accordance with claim 1, wherein step (c) includes the step of converting a compacting force sensed and measured in analog signal from information to digitized signal forms, and thereafter controlling the closed-loop feedback control network through utilization of the digitized signal forms.

7. The process in accordance with claim 1, wherein step (f) includes the step of imposing on said difference a weighted factor whereby the periodic adjustment of said die cavity size is accomplished in successive steps in order to obviate over and under adjustment of the die cavity size.

8. The process in accordance with claim 1, wherein step (g) includes selectively effecting one of the steps of (aa) said adjusting means operatively adjusting the die cavity size to increase the volume of ceramic particles if said average peak compacting force value is less than said predetermined standard compacting force value and (bb) said adjusting means operatively adjusting the die cavity size to decrease the volume of ceramic particles if said average peak compacting force value is greater than said predetermined standard compacting force value.

9. In a process for making briquettes from loose ceramic particles compressed together under a compacting force in a press by placing said particles in a die cavity of said press where said particles are compacted together into a self supporting briquette and thereafter removed from said die cavity, and successive compacting cycles producing said briquettes, the improvement comprising controlling the size of the die cavity through a closed-feedback control network to produce substantially constant density, size and weight briquettes and comprising the steps of:

(a) as part of a compacting cycle, placing said particles in a die cavity of a standard size corresponding to a predetermined standard compacting force value for producing a briquette having a predetermined density, size, and weight, (b) compacting said particles in said die cavity to produce a briquette thereafter removed from said die cavity, (c) continuously sensing and measuring during the compacting cycle of steps (a) and (b) the compacting force including a peak compacting force signal effected during the compacting cycle and during succeeding compacting cycles, (d) measuring in a manner which will effect averaging of peak compacting force signals of successive ones of the compacting cycles to determine an average peak compacting force value, (e) comparing the average peak compacting force value with the predetermined standard compacting force value to measure deviation of the average peak compacting force value from the predetermined standard peak compacting force value, (f) correlating such deviation to an amount of adjustment of said die cavity size required to obtain briquettes produced by succeeding compacting cycles and that are of a predetermined constant density, size, and weight, (g) mechanically adjusting the size of the die cavity in accordance with an adjustment signal relating to the deviation of the average peak compacting force value from said predetermined standard compacting force value, and (h) periodically adjusting the die cavity through the closed-loop feedback control network and in accordance with respective measured deviations whereby said press produces briquettes of substantially constant density, size and weight.

* * * * *